June 29, 1948.　　　M. M. CLAYTON　　　2,444,092
CABLE CLAMP
Filed Oct. 9, 1945
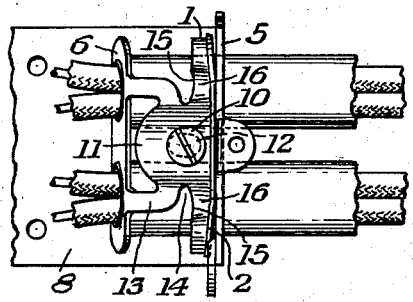
FIG. I.
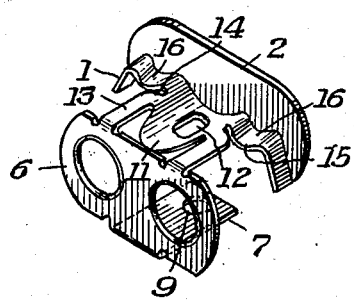
FIG. II.
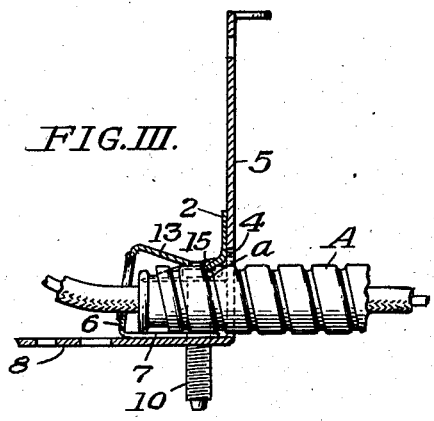
FIG. III.
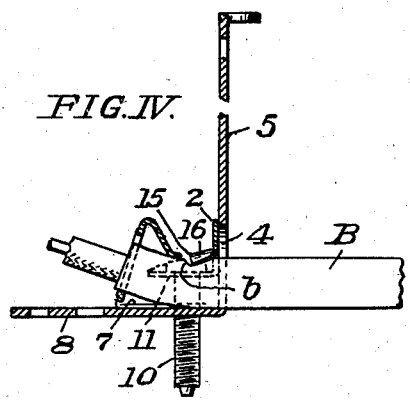
FIG. IV.
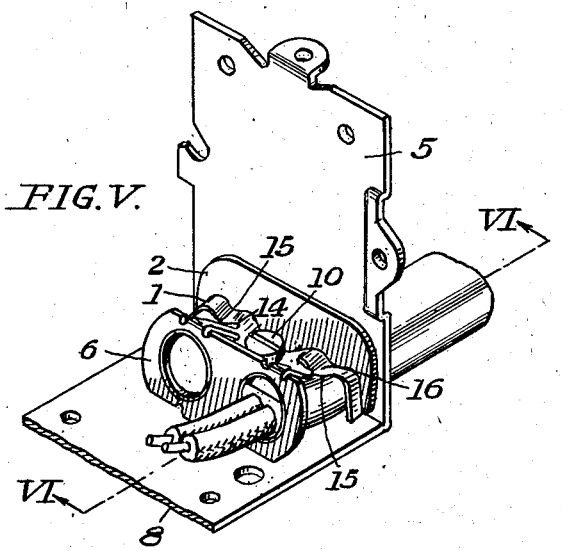
FIG. V.
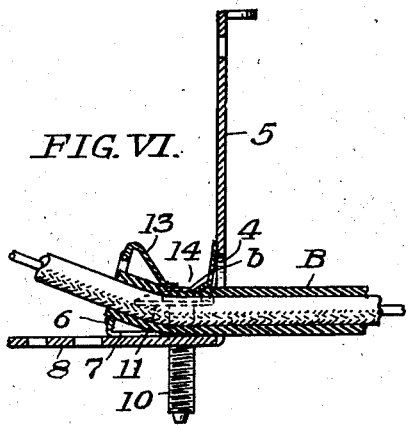
FIG. VI.
INVENTOR
Martin M. Clayton
BY William B. Wharton
his attorney Patented June 29, 1948

2,444,092

UNITED STATES PATENT OFFICE 2,444,092

CABLE CLAMP

Martin M. Clayton, Enon Valley, Pa., assignor to National Electric Products Corporation, Pittsburgh, Pa., a corporation of Delaware Application October 9, 1945, Serial No. 621,364

3 Claims. (Cl. 285—35.2)

This invention relates to a clamp for use in association with an outlet box clampingly to engage electrical cables.

Prior clamps of like general nature are shown representatively in Patent No. 1,822,128 to Martin M. Clayton and Patent No. 1,914,635 to William Goetzelman. The first of the said patents discloses a two-piece cable clamp and the latter a one-piece clamp. Whereas there is advantage in a one-piece clamp in facilitating initial assembly and manipulation while engaging cables to an outlet box, there is a serious problem involved in engaging non-metallic sheath cables, or "loom-wire" by means of clamps of that sort. Armored cable is readily engaged by cable clamps to withstand a severe and relatively prolonged pull, by clamping down on the cable to engage it between convolutions on a vertical edge of the outlet box wall at a cable-receiving opening therein. Engagement of that sort is not permissible in the case of non-metallic sheath cable, because a severe pull exerted on a cable of that sort when clamped in that manner, tends to strip the cover from the cable. It cannot be considered either a desirable or a secure engagement of the cable, inasmuch as it consists in placing the sheath of the cable under a shearing compression.

The object of my invention is to provide a one-piece cable clamp which, while particularly satisfactory for the clamping engagement of armored cable, exerts a clamping action of such sort that it holds non-metallic sheath cable securely with an engagement which tends to become increasingly firm under severe pull on the cable, by an increasing tendency penetratively to grip the cable jacket.

In the cable clamp of my invention there are free cable-engaging edges presented angularly against withdrawal of cables which have been clamped, which edges are disposed in assembly close to the interior surface of the outlet box wall through which the cables pass, so that there is a tendency to bunch against them the sheaths on the short lengths of non-metallic sheath cables which extend into the outlet box. The clamping action is by means of flexion exerted inward of the said free edges by means which are not directly connected with them, and which leave those edges free for their penetrative engagement of the cable sheath.

In the accompanying drawings illustrative of a physical embodiment of my invention:

Fig. I is a plan view of my cable clamp mounted between a vertical wall of an outlet box and the bottom wall thereof, showing two non-metallic sheath cables engaged to the outlet box by the clamp.

Fig. II is a perspective view of the cable clamp unrelated to other structure.

Fig. III is a view taken in vertical section through the two adjacent walls of an outlet box at which the clamp is mounted, illustrating the engagement of armored cable by the clamp.

Fig. IV is a similar view illustrating the engagement of non-metallic sheath cable by the clamp.

Fig. V is a perspective view of the clamp with one non-metallic sheath cable engaged thereby, illustrating the effect when a severe withdrawing pull is exerted on one of the cables engaged by the clamp.

Fig. VI is a longitudinal sectional view through the cable illustrating the same effect shown in Fig. V, and taken in the plane of the section line VI—VI of Fig. V.

The cable clamp of my invention is a one-piece structure composed of yielding metal. It comprises a clamping bar 1, having an upstanding skirt 2 which in all conditions of the clamp closes the cable-receiving openings 4 in a vertical wall 5 of an outlet box. Standing in approximate parallelism with the skirt 2 upstanding from the clamping bar, there is a wall 6 having therein bushed openings for the passage of cables. Extended backwardly from perforate wall 6 there is a foot 7 adapted to rest on the bottom wall, or floor, 8 of an outlet box and perforate at 9 for the passage of a clamping screw 10 threaded in the floor of the box. In vertically spaced relation with foot 7 there is a pressure plate 11, extended inwardly from clamping bar 1 and having therein a screw-receiving perforation 12 in alignment with the perforation 9 of foot 7.

In mounted position of the clamp, the skirt 2 of the clamping bar, lies in surface contact with, or closely parallel to the interior surface of the outlet box wall; and perforate wall 6 stands at a lower level but approximately parallel to skirt 2, with clamping screw 10 passed freely through the matching perforations in pressure plate 11 and in foot 7, and engaging its threaded opening in the floor of the box. There is of necessity connection between the structure of the clamping bar and the structure of the bushed wall and its associated foot, and it is in the form and arrangement of the means for making such connection and the form and arrangement of the clamping bar itself that the novel clamping effect of my cable clamp rises.

The connecting means are a pair of flexible straps which spring from the upper edge of bushed wall 6 and which extend to points of indirect connection with clamping bar 1 at such points as to leave free edges of the clamping bar on both sides of plate 11. These points of connection are with the sides of plate 11, and from such points the straps extend laterally and then inwardly to wall 6, to leave intervals 14 between them and the inwardly presented cable-engaging edges 15 of the clamping bar. Clamping bar 1 has a relatively short inward extent from the backing provided by its skirt 2, and is therefore relatively rigid. Its rigidity is increased and its clamping effect enhanced by longitudinal corrugations which provide indentations or downward extensions 16, terminating at the clamping edges 15 longitudinally in line with the bushed openings in wall 6.

Under the pressure of screw 10 on pressure plate 11, there is a force bearing downwardly on the outer structural elements of the clamp comprising the pressure plate 11, the clamping bar 1 and its vertical skirt 2. Under this applied force straps 13 flex. Such flexion occurs chiefly at the junction between the lateral extent and the longitudinal extent of each strap, and involves a slight twisting as well as a downward bending of the straps. As the clamping bar moves downwardly with this flexion of the straps, its skirt 2 thus maintains its parallel relation and full surface contact with the wall of the outlet box, to give firm backing to the clamping bar. The chief clamping engagement with the cable is at the free inwardly presented edges 15 of the clamping bar.

Referring to Fig. III of the drawings which show armored cables A engaged to an outlet box by the clamp, it will be seen that the clamping edges 15, one of which is visible, engages behind one of the convolutions a of the cable armor when screw 10 is run down. This gives an engagement of the cable by the clamp itself which is in direct opposition to forces tending to pull the cable from the outlet box as well as pressure exerted by the clamp normal to the axis of the cable. In clamping armored cable by means of my clamp, it is therefore unnecessary to place the openings 4 in the vertical wall of the outlet box so as to leave cable-engaging stub walls at the base of such openings, as in Clayton Patent No. 1,822,128 and Goetzelman Patent No. 1,914,635 referred to above. Such stub wall may therefore be omitted, if it is desired to avoid radial pinching of non-metallic sheath cable in outlet boxes intended, as is customary in the art, for use with cables of both types.

Non-metallic sheath cable, or "loom-wire" has none of the properties which simplify the clamping of armored cable in an outlet box. That is, it does not present the hard, convoluted structure of the armored cable to provide firm irregularity for gripping engagement. On the contrary the surface of such cables is smooth and their structure is compressible; consisting as they do of rubber insulation, crumpled paper, braid, and one or more coatings of saturant, pitch, wax and the like surrounding the pair of electrical conductors they enclose. It has been explained above that the engagement of cables of that sort has been imperfect, even though the clamping effect of compression alone be supplemented by cable-indenting deformation of the cable structure, or by a stub wall at the base of the outlet box openings against which the cable is pressed. In both cases a severe outward pull produces a scraping or furrowing effect on the jacket of the cable, so that the engagement yields under the exertion of a pull which is relatively moderate in applied force and duration. Clamps intended for the engagement of cables of both types in an outlet box, may therefore be effective for engaging armored cable but are relatively ineffective for engaging non-metallic sheath cable.

Referring to Fig. IV of the drawings, a non-metallic sheath cable, or cables, B are shown engaged in an outlet box by my clamp, one such cable being visible. In this view it is seen that as the clamping screw 10 is run down, the structure of the cable is compressed between the clamp and the floor 8 of the outlet box, the compression being in large measure concentrated in those areas in which the downward indentations 16 of the clamping bar are located. This causes the structure of the cable sheaths to bunch out inwardly of the clamping bar and upwardly beyond the free edges 15 at the inward ends of the indentations. This forms in the cable sheath a shoulder b inwardly of the cooperative edge 15 of the clamping bar and against which that edge bears.

In this clamped condition of the cable, a severe outward pull on the cable causes the cable-engaging edge 15 to bite in the bunched shoulder b, and as the pulling continues causes the cable sheath to be increasingly bunched at that edge. There is, even under the pressure against it, some tendency for the edge 15 to be slightly depressed, or tilted, and thus to bite more deeply into the cable sheath.

The above effect, which is illustrated in Figs. V and VI of the drawings, results in an increasing security of clamping engagement under forces tending to pull the cable outwardly from engagement in the outlet box. My cable clamp thus takes advantage in a novel manner of those very properties of non-metallic sheath cable which previously have detracted from the security of its clamped engagement, to provide an engagement of superior and approved sort.

It will be noted that Fig. IV of the drawings does not show a stub wall against which the cable is forced by the clamp, the openings 4 in outlet box wall 5 having their lower peripheries touching the bottom wall, or floor, 8 of the box. This illustrates the fact that in use of my clamp such stub wall is unnecessary in clamping non-metallic sheath cable, as well as in clamping armored cable. It is a fact, however, that such stub wall may be present without detrimental effect, because the firm engagement of the cable sheath against a free edge 15 of the clamping bar prevents positively withdrawal of the cable by scraping or furrowing against the edge of such wall.

It will be appreciated that the advantages of my cable clamp as explained above are all obtained without in any degree impairing the general advantages of a one-piece cable clamp, in facilitating initial assembly of the clamp with an outlet box and facilitating the clamping engagement of cables with the structure of the outlet box.

Having shown and described one specific embodiment of my invention, it is to be understood that such showing and description are illustrative and exemplary of that invention, and that changes in form and arrangement may be made within the boundaries defined by the claims appended hereto.

I claim as my invention:

1. A one-piece cable clamp for securing cables to an outlet box comprising a clamping-bar, a pressure plate extended from said clamping-bar, a wall member perforate for the passage of cables spaced from said clamping-bar, means for applying deflecting force on said pressure plate, said means being sufficiently remote from the rear edge of said clamping bar to tilt said clamping bar when pressure is applied to the pressure plate, and yielding connector straps extended laterally from said pressure plate and longitudinally to said perforate wall providing free cable-clamping edges on said clamping bar and having points of flexion adjacent the said cable-clamping edges to force the cable-clamping edges of the clamping-bar into clamping engagement with cables lying beneath the clamping bar.

2. A one-piece cable clamp for securing cables to an outlet box comprising a wall member perforate for the passage of cables, a horizontally disposed clamping-bar spaced from the said wall and having depressed regions with cable-clamping edges presented toward the said wall member, a pressure plate extended from the said clamping-bar toward the said wall member, means for exerting a depressing force on said pressure plate, said means being sufficiently remote from the rear edge of said clamping bar to tilt said clamping bar when pressure is applied to the pressure plate, and yielding connector straps extended from said pressure plate to said wall member free of the cable-clamping edge of the said clamping-bar and arranged to flex under the application of depressing force on said pressure plate to bring the free cable-clamping edges of the clamping-bar into clamping engagement with cables lying beneath the clamping-bar.

3. A one-piece cable clamp composed of an inward structure adapted to be anchored in an outlet box, an outward structure adapted to bear against the inner wall surface of the outlet box comprising a clamping-bar having free cable-clamping edges presented toward the said inner anchored structure, yielding connector structure extended between said outward structure and said inward anchored structure adapted to flex under depressing forces to bring the free edges of the said clamping-bar into clamping engagement with cables which are to be secured to the outlet box, and means for applying depressing force on said connector structure, said means being sufficiently remote from the rear edge of said clamping bar to tilt said clamping bar when pressure is applied to the connector structure.

MARTIN M. CLAYTON.

REFERENCES CITED

The following references are of record in the file of this patent:

UNITED STATES PATENTS

| Number | Name | Date |
| --- | --- | --- |
| 1,711,912 | Vaughn et al. | May 7, 1929 |
| 1,822,128 | Clayton | Sept. 8, 1931 |
| 1,914,635 | Goetzelman | June 20, 1933 |

Certificate of Correction

Patent No. 2,444,092.

June 29, 1948.

MARTIN M. CLAYTON

It is hereby certified that errors appear in the printed specification of the above numbered patent requiring correction as follows: Column 5, line 4, claim 1, and line 25, claim 2, for the word "extended" read *extending forwardly*; and that the said Letters Patent should be read with these corrections therein that the same may conform with the record of the case in the Patent Office.

Signed and sealed this 12th day of October, A. D. 1948.

[SEAL]

THOMAS F. MURPHY,
*Assistant Commissioner of Patents.*